US010580029B2

(12) United States Patent
Beatty et al.

(10) Patent No.: US 10,580,029 B2
(45) Date of Patent: Mar. 3, 2020

(54) EXTENSIBLE POINT-OF-SALE PLATFORMS AND ASSOCIATED METHODS

(71) Applicant: Clover Network, Inc., Sunnyvale, CA (US)

(72) Inventors: John Daniel Beatty, Emerald Hills, CA (US); Tamer Mohamed El Calamawy, Redwood City, CA (US); Jacob Whitaker Abrams, San Mateo, CA (US); Michael Joseph Quinlan, Sunnyvale, CA (US); Jeffrey Blattman, San Jose, CA (US)

(73) Assignee: Clover Network, Inc., Sunnyvale, CA (US)

( * ) Notice: Subject to any disclaimer, the term of this patent is extended or adjusted under 35 U.S.C. 154(b) by 562 days.

(21) Appl. No.: 14/925,966

(22) Filed: Oct. 28, 2015

(65) Prior Publication Data
US 2016/0125449 A1      May 5, 2016

Related U.S. Application Data

(60) Provisional application No. 62/074,063, filed on Nov. 2, 2014.

(51) Int. Cl.
*G06Q 30/02* (2012.01)
*G06Q 20/20* (2012.01)

(52) U.S. Cl.
CPC ....... *G06Q 30/0238* (2013.01); *G06Q 20/202* (2013.01)

(58) Field of Classification Search
CPC .. G06Q 30/0238; G06Q 20/202; G06Q 30/02; G06Q 20/20
USPC ............................................. 705/24
See application file for complete search history.

(56) References Cited

U.S. PATENT DOCUMENTS

| | | | | |
|---|---|---|---|---|
| 2002/0060808 | A1* | 5/2002 | Henderson et al. | 358/1.15 |
| 2004/0186762 | A1* | 9/2004 | Beaven | G06Q 10/0633 705/7.27 |
| 2009/0319382 | A1* | 12/2009 | Shah et al. | 705/17 |
| 2011/0307318 | A1* | 12/2011 | LaPorte | G06Q 20/209 705/14.33 |
| 2015/0220963 | A1* | 8/2015 | Priebatsch | 705/14.38 |

* cited by examiner

*Primary Examiner* — Luna Champagne
(74) *Attorney, Agent, or Firm* — Daylight Law, P.C.

(57) ABSTRACT

A computer-implemented method for an extensible point-of-sale device is disclosed. The method includes registering a third-party application to be notified of a transaction change on the point-of-sale device. The method also includes displaying a user interface to a user during a purchase transaction on a display of the point-of-sale device using one of a register module and a payment module. The method also includes receiving the transaction change via the user interface of the point-of-sale device. The method also includes broadcasting the transaction change to a set of registered applications that includes the third-party application. The method also includes taking an action that modifies the purchase transaction using the third-party application in response to the broadcasting.

15 Claims, 7 Drawing Sheets

| CURRENT ORDER (36) | |
|---|---|
| 1 CHESAPEAKE PLANTER | $50.00 |
|     TACO TUESDAYS | $(5.00) |
| 1 LILY SEEDS | $1.00 |

⎯ 502

TOTAL
SUBTOTAL    $46.00
TAX    $3.80
TOTAL    $49.80

▬▬ SCAN BARCODE

EXTENSIBLE POINT-OF-SALE PLATFORMS AND ASSOCIATED METHODS

CROSS REFERENCE TO RELATED APPLICATION

This application claims the benefit of U.S. Provisional Application No. 62/074,063, filed on Nov. 2, 2014, which is incorporated by reference in its entirety herein for all purposes.

BACKGROUND OF THE INVENTION

Point-of-sale (POS) systems allow users, such as merchants, to offer customers flexibility in completing goods or services sales transactions. However, such systems can be limited to built-in functionalities, which may hinder the flexibility. Some of the functions lacking from such systems may be the ability for third-party developers to tailor applications that provide customers with a variety of options during their purchasing experience. The lack of options to pay for or take advantage of during their purchases can lead to a relatively poor user experience and/or inefficient transactions.

SUMMARY OF INVENTION

In one embodiment, a computer-implemented method for an extensible point-of-sale device is provided. The method includes registering a third-party application to be notified of a transaction change on the point-of-sale device. The method also includes displaying a user interface to a user during a purchase transaction on a display of the point-of-sale device using one of a register module and a payment module. The method also includes receiving the transaction change via the user interface of the point-of-sale device. The method also includes broadcasting the transaction change to a set of registered applications that includes the third-party application. The method also includes taking an action that modifies the purchase transaction using the third-party application in response to the broadcasting.

In another embodiment, an extensible point-of-sale device is disclosed. The device comprises a POS processing service that registers a third-party application to be notified of a transaction change on the point-of-sale device. The device also comprises a display that displays a user interface to a user during a purchase transaction. The device also comprises a register module that receives the transaction change involving the purchase transaction via the user interface of the point-of-sale device. The third-party application is configured to take an action to modify the purchase transaction in response to a trigger. The POS processing service is configured to provide the trigger via a broadcast of the transaction change to a set of registered applications that includes the third-party application.

In another embodiment, a computer-implemented method for an extensible point-of-sale device is disclosed. The method comprises displaying a user interface to a user during a purchase transaction on a display of the point-of-sale device using a register module. The method also comprises modifying a customer order with a modification received via the user interface of the point-of-sale device. The method also comprises updating a database using the modification and a server. The method also comprises broadcasting the modification to a plurality of other point-of-sale devices.

BRIEF DESCRIPTION OF THE DRAWINGS

FIGS. 5 and 6 illustrate example user interfaces displayed when operating an extensible POS platform in accordance with one or more example embodiments.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

Described herein are systems and methods for providing an extensible POS (point-of-sale) platform. Broadly, the systems and methods described herein may facilitate providing an extensible POS platform to allow interactions with local services and/or third-party applications during POS transactions (e.g., financial transactions, advertisement transactions, coupon transactions, etc.) at physical and/or remote retail locations. Thus, one or more user devices may allow the extensibility of functions (e.g., internal applications, third-party applications, Internet applications, etc.), where these functions may influence what is displayed at the POS platform during a POS transaction. For example, a merchant may use a POS platform to complete a transaction with a customer who may have placed an order for products or services (e.g., purchasing batteries, etc.), where the POS platform may allow the extensibility of its functions to include interactions with a third-party application programming interface (API) to, in certain instances, apply additional services (e.g., tender services or various forms of payment).

POS Platform Architecture

Figure 1:
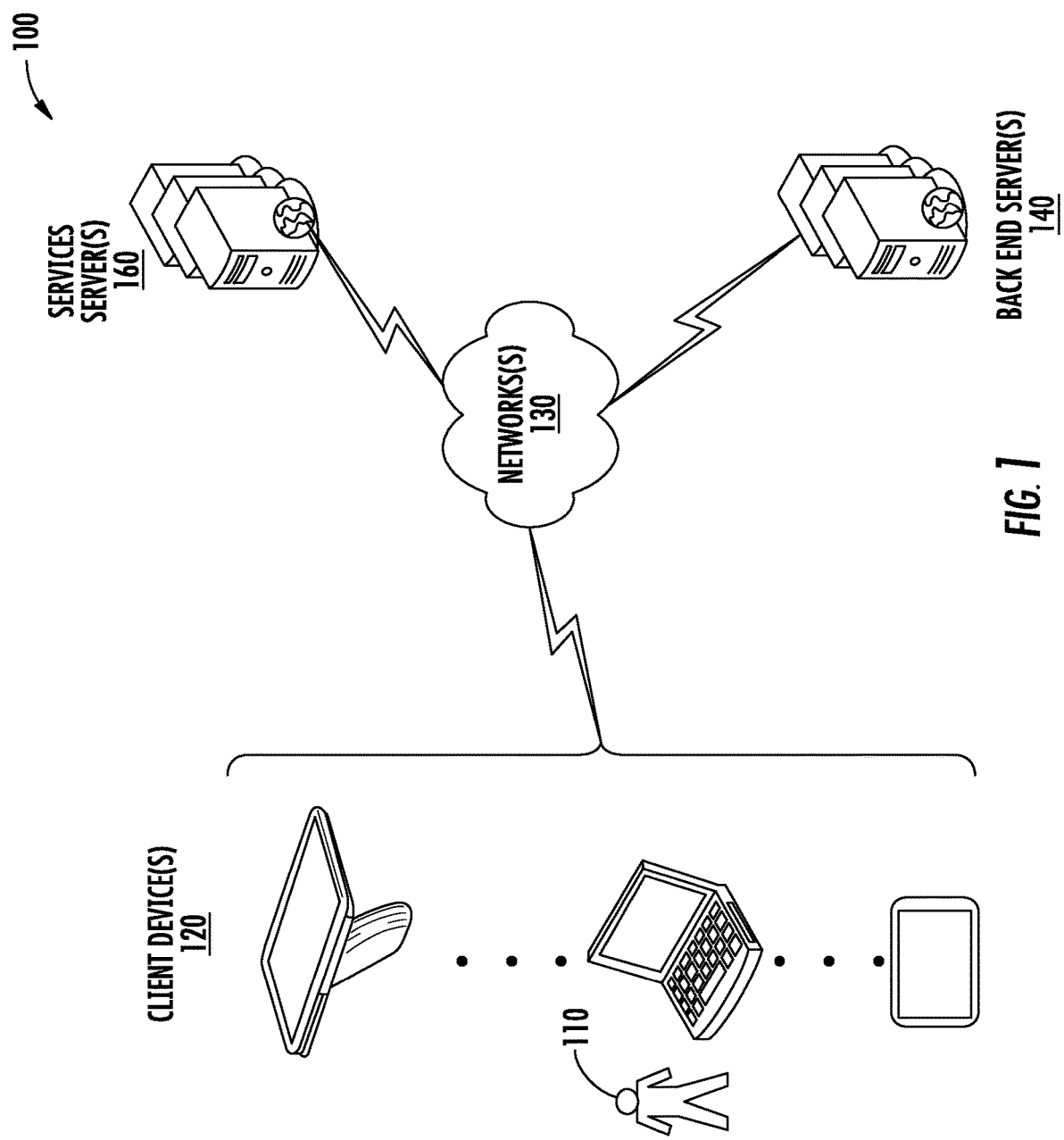
FIG. 1 illustrates an example system architecture for an extensible POS platform in accordance with one or more example embodiments.

Referring now to FIG. 1, there is shown an example network architecture for a POS platform system 100 according to certain embodiments of the disclosure. The POS platform system 100 may include one or more client devices 120. The one or more client devices 120 may be a POS device, a mobile device, a laptop computer, a desktop computer, another device with computer functionalities, or any combination thereof and/or other types of devices associated with a merchant at various locations. For example, a client device, such as 120, may be purpose-built POS equipment, a self-service kiosk, a smart phone, a tablet, a wearable computer device, or an e-reader operating a mobile operating system, such as Android OS™. Each client device 120 may be coupled to one or more remote services servers 160 via a client API, which may be used to access the services and functionalities provided by the remote services servers 160. Each of the client devices 120 may communicate with the one or more remote services servers 160 via one or more networks 130.

Figure 3:
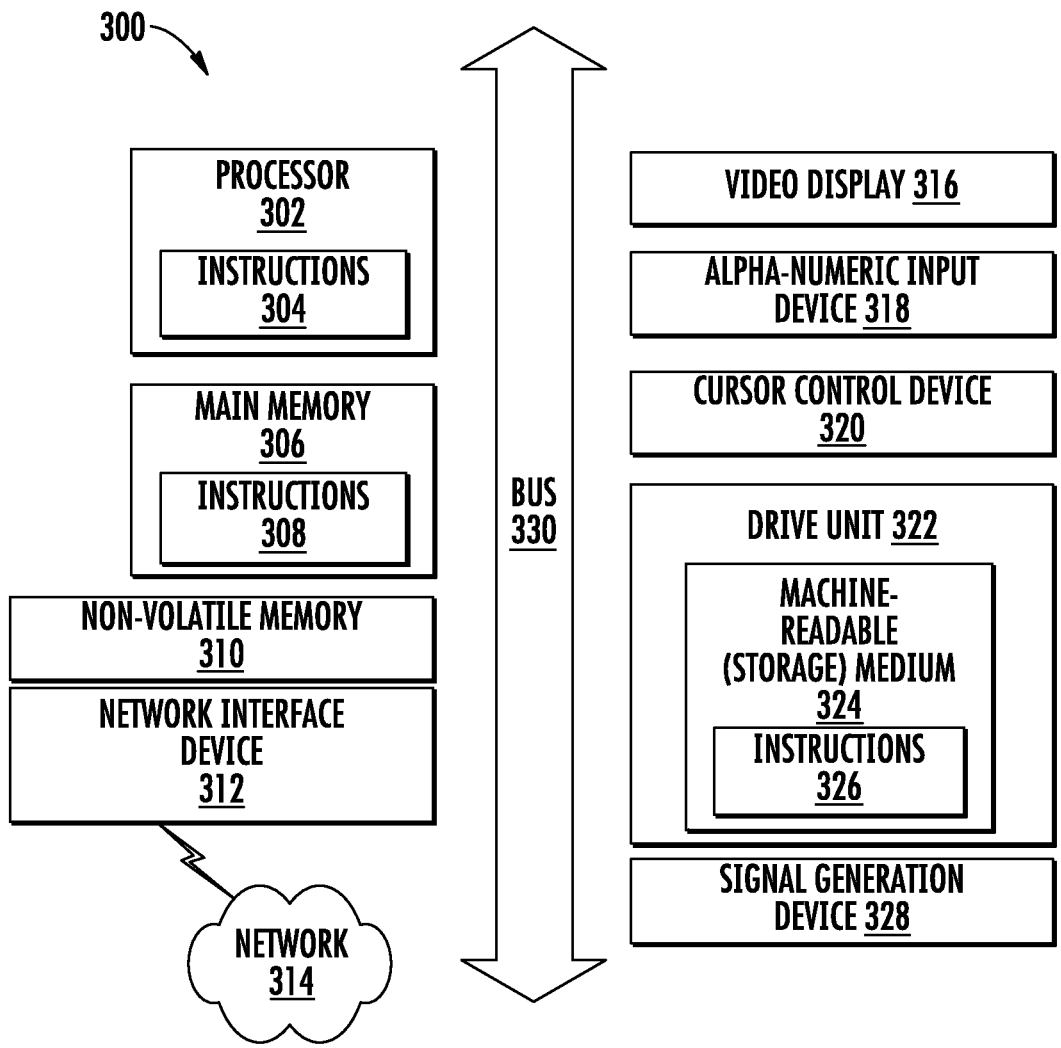
FIG. 3 illustrates a diagram of an example computer system within which a set of instructions may be executed to cause the machine to perform any one or more of the methodologies or modules discussed herein in accordance with one or more example embodiments.

The one or more remote services servers 160 may be implemented by a computer system, such as the computer system 300 of FIG. 3. In some embodiments, the one or more remote services servers 160 may be a cloud-based computer system, where no on-premise servers are required, which may reduce relative cost and complexity of hardware, installation, and ongoing maintenance and administration.

The POS platform system 100 may also include one or more back-end servers 140. Each of the back-end servers 140 may be one or more independent computer systems, such as the computer system 300 of FIG. 3, for performing back-end processes for sales transactions. The one or more back-end servers 140 may be coupled to the one or more remote services servers 160 via a back-end API. The back-end API may be an application programming interface for the one or more back-end servers 140 to supplement the services provided by the one or more remote services servers 160. The one or more back-end servers 140 may communicate with the one or more remote services servers 160 via network 130 as well.

The one or more networks 130 may be a system for communication. Each of the networks 130 may encompass a variety of mediums of communication, such as wired communication for one part and wireless communication for another part. The one or more networks 130 may be part of the Internet.

For example, a network, such as 130, may include an Ethernet or other wire-based network or a wireless NIC (WNIC) or wireless adapter for communicating with a wireless network, such as a WI-FI network. The network 130 may include any suitable network for any suitable communication interface. As an example and not by way of limitation, the network channel may include an ad hoc network, a personal area network (PAN), a local area network (LAN), a wide area network (WAN), a metropolitan area network (MAN), or one or more portions of the Internet or a combination of two or more of these networks. One or more portions of one or more of these networks may be wired or wireless. As another example, the network may be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the one or more networks 130 may use standard communications technologies and/or protocols. Thus, each network 130 may include links using technologies such as Ethernet, 802.11, worldwide interoperability for microwave access (WiMAX), 3G, 4G, CDMA, digital subscriber line (DSL), etc. Similarly, the networking protocols used on the network may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP).

The data exchanged over the network 130 may be represented using technologies and/or formats including the hypertext markup language (HTML) and the extensible markup language (XML). In addition, all or some links may be encrypted using conventional encryption technologies such as secure sockets layer (SSL), transport layer security (TLS), and Internet Protocol security (IPsec).

Figure 2:
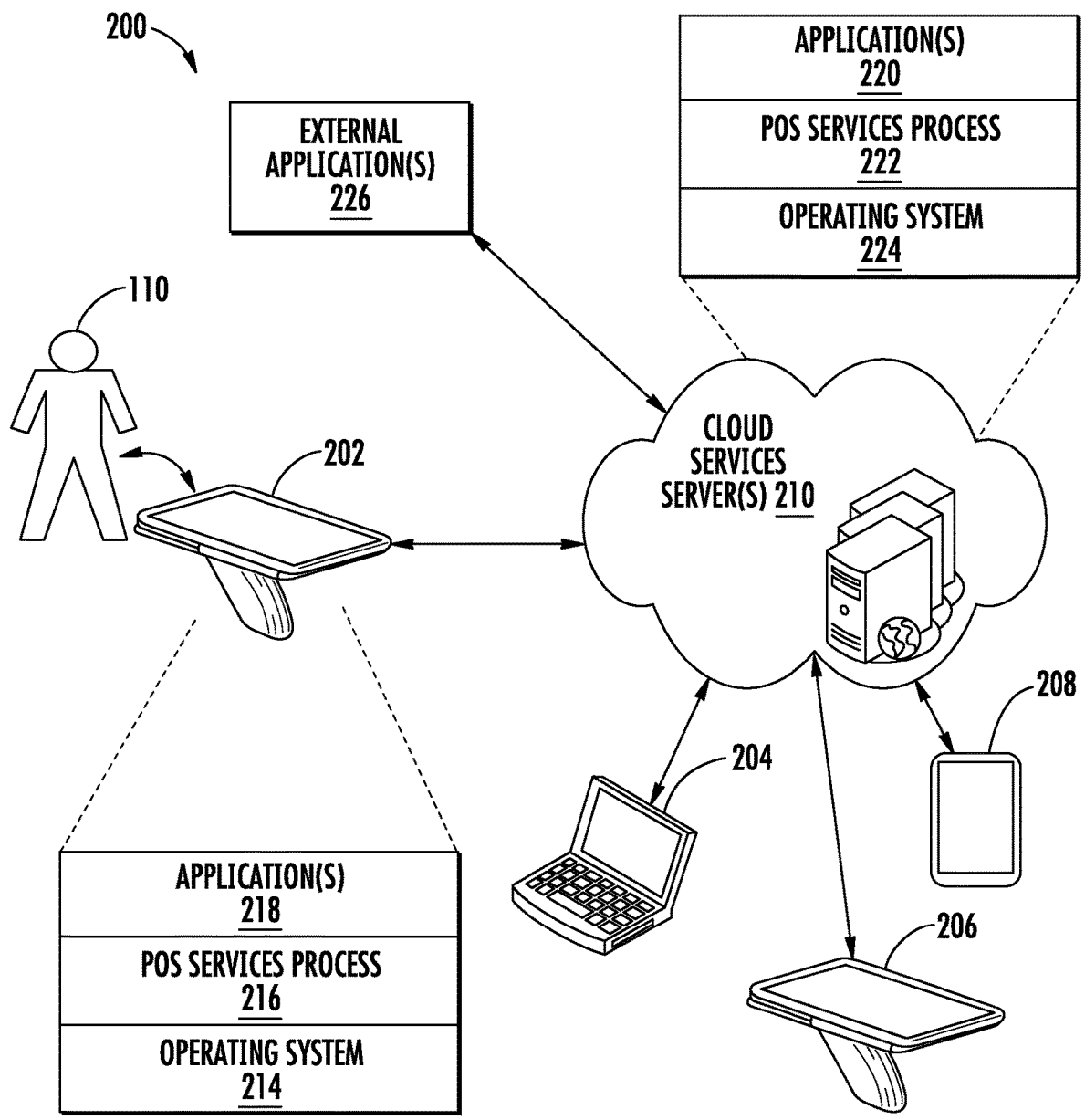
FIG. 2 illustrates another example system architecture for an extensible POS platform in accordance with one or more example embodiments.

With reference to FIG. 2, there is shown an example architecture 200 of an extensible POS platform in accordance with one or more embodiments of the disclosure. In some embodiments, one or more client devices (e.g., client devices 202, 204, 206, and 208), may be located at one or more respective locations (e.g., restaurants, hardware stores, malls, etc.). As explained above, the client devices may be implemented by a computer system, such as the computer system 300 of FIG. 3, which may be controlled by operating system software (e.g., operating system 214). For illustrative purposes, the operating system, such as 214, may be, for example, an Android-based operating system.

Each of the client devices (e.g., client devices 202, 204, 206, and 208) may also include POS services (e.g., Clover® services, or any other services that relate to a point-of-sale system). Additionally, each of the client devices (e.g., client devices 202, 204, 206, and 208) may include applications that may be built-in or may be provided by third-party applications. For example, one or more applications 218 may include a register module, which may be configured to provide an interface for an operator of the merchant/business to facilitate sales transactions. The register module may have bar code scanner functionality, check-out functionality, payment functionality, or any combination thereof. The register module may be part of a built-in register application for the point-of-sale device. It is understood that the register module is one of many possible modules that may exist within each of the applications, such as 218, on respective client devices (e.g., client devices 202, 204, 206, and 208), and that other modules may be implemented. The one or more applications 218 may be any application that may be built-in, installed, or added to the client devices 202, 204, 206, and 208.

Data Synchronization and Remote Processing

Through the use of architecture 200, modifications to a transaction made using a client device, such as POS device 202, may be synchronized across multiple client devices (e.g., client devices 202, 204, 206, and 208), and may be provided to a server for remote processing. A change to a transaction may be, for example, adding new items to the order, adding additional charges (e.g., for shipping), including a donation to a charity with the order, adding taxes, receiving payment information, printing a receipt, applying coupons, adding a special notice on the transaction, or any other changes associated with the transaction. Synchronization can involve both a push of data from the client device to a datastore via cloud services server 210 and a distribution of that data from the datastore to the multiple client devices. The datastore can comprise multiple databases associated with the overall POS system such as an orders database, a transactions database, an inventory database, and others. Remote processing can involve remote servers operating on the information provided directly by the client devices or data stored in the datastore. For example, the client devices (e.g., client devices 202, 204, 206, and 208) may utilize remote servers, such as cloud services servers (e.g., cloud services server(s) 210) to execute a sales transaction.

The client device (e.g., client devices 202, 204, 206, and 208) may implement a queue for recording changes that occur during a transaction. For example, adding an item to an order may cause the queue to record that action for a relatively short period of time. An item may be a product or service associated with the client device (e.g., client device 202). As another example, the client device can record payment information added to the transaction for payment processing. The client device (e.g., client device 202) may transmit the items in the queue to the server (e.g., cloud services server 210) over the network (e.g., network 130) for processing by a remote server. In an example, a merchant (e.g., user 110) may use a client device, such as POS device 202, to create a customer order for a product. The user 110 may, via the POS device 202, generate an order identifier and associate it with the order. For example, if a customer places an order for a certain product, the product may be inserted into the order as a line item. The line item for the product may have an identifier associated with it. The order may be stored on the POS device 202, which in turn may store the order and associated identifier information in a local database or other datastore. The order may then be put into a queue displayed by the POS device 202. The order may be stored in a data object, and the data object may be stored in the queue.

In some embodiments, the transaction change can involve the merchant (e.g., user 110) obtaining payment information from the customer, such as by swiping a credit card or other payment device using a reader associated with the POS device 202. The credit card or payment device information may be encrypted by the POS device 202, and stored by the POS device 202 in an object associated with the order. In some embodiments, the merchant may select a tender type (e.g., credit card, debit card, gift card, payment device, etc.) via the POS device 202. The payment information and tender type may be stored by the POS device 202 in a data object, and the data object may then be placed into the queue displayed by the POS device 202 as the next item after the corresponding order.

In any instance, when the POS device, such as 202, is online, the items may be stored in the queue for a relatively short period of time. The POS device 202 may transmit the items in the queue to a server (e.g. cloud services server(s) 210) over the one or more networks, such as 130. If the POS device 202 is not able to communicate with the server, such as 210, the order items may be stored by the POS device 202 in the queue until a connection to the server 210 can be established. Once the POS device 202 is able to communicate with the server 210, items in the queue may be transmitted to the server for processing. Processing by the server, such as 210, may include adding the items to remote databases, processing payments, and communicating items back to one or more POS devices for further processing. For example, if there are multiple POS devices being utilized by merchants, and each merchant is creating and transmitting orders to the server 210, the server 210 may aggregate the orders, which may be based on time of receipt of the orders, and transmit the aggregated orders to at least one of the or multiple POS devices for fulfillment of the orders.

In some embodiments, the server (e.g., cloud services server(s) 210) may include a queue to receive items from the one or more client devices (e.g., client devices 202, 204, 206, and/or 208) of a merchant (e.g., user 110). The server, such as 210, may process items as they are being received in the queue. Multiple databases may be updated by the server 210 based on the items in an order. For example, the product line item in the above example may be decremented from an inventory database, may be added to a sales database, and the like. The update to the different databases may trigger synchronization across some or all of the client devices (e.g., client devices 202, 204, 206, and 208). This may enable the merchant (e.g., user 110) to have suitable information when interacting with a customer. For example, if the product is ordered, and it is the last product available, some or all of the client devices may be updated so that merchants can be alerted or otherwise notified that they may no longer take orders for certain products.

Additionally, a cloud services server (e.g., cloud services server(s) 210) may include applications (e.g. application(s) 220) that may be built-in or may be provided by third-party applications. In an illustrative example, a user (e.g., user 110) may initiate a transaction and/or modify a transaction (e.g., creating/modifying a purchase order of a product or a service) on a client device (e.g., client device 202). The POS services process (e.g., POS services process 216) may notify the cloud services server (e.g., cloud services server 210), which, in turn, may broadcast to other client devices (e.g., client devices 204, 206, and 208) that a change to a transaction may have occurred. As explained above, a change to a transaction may be, for example, adding new items to the order, including a donation to a charity with the order, adding taxes, receiving payment information, printing a receipt, applying coupons, adding a special notice to the transaction, or any other changes associated with the transaction.

Continuing with the example above, the POS services process 222 of the cloud services server 210 may receive an indication of a change in an order or transaction performed at one or more of the client devices (e.g., client devices 202, 204, 206, and 208), which may be received directly or through the one or more networks 130. Other applications (e.g., applications 220, and/or external applications 226), including third-party applications, may also be registered to be notified of any changes on the one or more client devices. In the event of an order or transaction change, the POS services process 222 of the cloud services server 210 may broadcast to some or all registered devices and applications that a change has occurred. Examples of these third party applications are provided below.

Registering applications for specific transaction changes provides certain benefits to the extensible POS platform in that the POS service process or operating system (e.g., 214, 216, 222, 224) will be able to operate more efficiently. Although broadcasting to all applications that are registered with the operating system is feasible, in actuality such a system would be both less stable and less efficient than one in which particular applications are registered for particular modifications. When a subset of applications are registered for particular modifications (e.g., a third-party donation application is registered such that a payment confirmation screen serves as an explicit trigger for generating a "donate" button) the POS services process or operating system will know to expect a response within a certain time period. As a result, there is no need to design a worst-case response time monitoring system into the platform to allow for potential, but uncertain responses. Furthermore, if no applications are registered to receive a specific broadcast, the POS services process or operating system can forgo sending the broadcast itself and can immediately continue on with any given transaction.

Open Platform

In some embodiments, the POS platform system may be an open platform, wherein the open platform may provide access to the system to allow third-party developers to develop their own applications to augment or provide further functionality to the system. For example, using any number of application program interfaces (APIs) or similar structures, data may be pulled from the system, and data may be pushed into the system. This may enable third-party developers to develop applications that may run concurrently with the system and augment system functionality. Further, application(s) 218 may include applications from a third-party vendor, which may provide additional functionalities. In one embodiment, the additional functionality may be based upon one or more predetermined preferences (e.g., merchant preferences, system administrator preferences, location preferences, type of store preferences, etc.). As noted above, application(s) 220 can also include these third-party applications and owing to the extensibility of the POS platform, third-party applications provided via cloud services server(s) 210 will share disclosed characteristics of third-party applications in the set of application(s) 218. Finally, the synchronization of data across multiple devices provided by the extensible POS platform results in a system where the third-party applications can implement an action on one client device in response to an event generated by another client device.

One or more applications that may be executed by a POS services process (e.g., POS services process 216, and/or 222) may allow other applications, such as one or more third-party or external applications 226, to control certain features or functionality of a client device 120. An application running on a client device (e.g., application 218 running on client device 202) may be provided by a third party and may be implemented to provide certain functions when a condition is met. An external application 226 or third-party application may be permitted to share resources with one or more built-in applications of the client device 120. The one or more external applications 226 or third-party applications may focus on performing their respective functions without having to perform some or all certain functions of the client device, such as those necessary to operate a POS infrastructure. Furthermore, the shared-resource functionality may allow the one or more external applications 226 or third-party applications to receive any number of various payment types without needing to communicate with a payment server dedicated to a particular POS infrastructure.

The functionality discussed above with reference to registering applications and broadcasting modifications that trigger those applications to take certain actions can be applied to facilitate this shared-resource functionality. In some embodiments, one or more triggers may allow any number of the one or more external applications 226 or third party applications to control certain functions of the device 120. The triggers may be either explicit or implicit. Explicit triggers may include, but are not limited to, a new order created, a line item added or removed from an order, a payment made, a refund made, and a pay button clicked. Implicit triggers may include, but are not limited to, a change in the employee operating the client device 120, a change in an order of a sales transaction, and a change in the inventory of items. These explicit or implicit triggers may allow one or more third-party or external applications 226 to share the resources of the client device 120 to provide one or more functionalities specific to the one or more third-party or external applications 226. Any of the transaction modifications described above can be used as triggers for these processes.

In accordance with the shared-resource functionality described above, the payment flow for a particular transaction that is being administrated by the register and payment modules can be modified to include information and functionality from a third-party or external application. One or more third-party or external applications 226 may control one or more functions of the client device 120, such as output to an associated display screen. For example, during a purchase transaction for an item or a service, a donation button may be created by a third-party or external application on a payment window of a display screen of a client device 120 so that a customer user may contribute to a particular charity associated with the donation button.

The sharing of resources and information between applications is not limited to the functionality of a particular client device. Through the use of the data synchronization capabilities of the POS platform, information can be shared across multiple devices. Furthermore, the triggers that the external or third-party applications are listening for do not need to be generated on the same device on which the corresponding action will be taken. If a user (e.g., user 110) initiates and/or modifies a transaction (e.g., creating/modifying a purchase order of a product or a service) on a client device (e.g., client device 202), the POS services process (e.g., POS services process 216) may broadcast to other client devices (e.g., client devices 204, 206, and 208) that a change to a transaction occurred. The change to the transaction can be any of the examples previously provided. The following example of a happy hour application illustrates this point. In this example, the client devices are co-located; however, it is understood that this is only an example, and client devices may be located at different locations.

. A third-party happy hour application may be interested in an event (e.g., transaction occurring within a certain time frame) that may occur on a client device (e.g., client device 202). In that case, the happy hour application may be interested in the event occurring on a client device (e.g., modification of an order to add new items, etc.) occurring at a certain time frame (e.g., between the hours of 5 PM and 7 PM). As such, the event will serve as the trigger for execution of the application's action. The happy hour application may then take certain actions associated with the event (e.g., applying a coupon, providing advertisement, inserting an image onto a sales receipt, or any other function). In some embodiments, if the same transaction is accessed from other client devices (e.g., client devices 204, 206, and 208), the transaction may be updated in real time across some or all of these client devices.

As a further exemplary feature of the open platform architecture, one or more applications may be executed by a POS services process (e.g., POS services process 216, and/or 222) to allow for extensibility of tender or payment methods. The client device 202 may include a payment module that provides or otherwise facilitates certain payment methods. The payment module may be configured to facilitate acceptance during a payment transaction of various tender types such as cash, credit, debit, or any other form of payment currency or compensation accepted by a merchant (e.g., user 110). Additionally, the client device 202 may be updated to accept additional payment methods, for example, from a third-party application. Additional payment method(s) may be added to a client device (e.g., client devices 202, 204, 206, and/or 208). Some examples of payment methods that may be added may be Bitcoin™, prepaid vouchers (e.g., Groupon™, LivingSocial™, etc.), prepaid gift cards (e.g., Gyft®, etc.), virtual checks, virtual wallets, or any other form of digital and/or virtual currency payment methods. A payment table may be maintained by a client device (e.g., client devices 202, 204, 206, and/or 208) and/or cloud services server(s) 210 or back-end server(s) 140 to maintain the merchant ID and the amount due, and also to store a correlation ID to the additional payment tender (e.g., Bitcoin™, etc.). This table may be accessible by the third-party application (e.g., Bitcoin™ application) to store a bitcoin ID for auditing and/or retrieval purposes.

The external or third-party application (e.g., Gyft®, Bitcoin™ applications, etc.) may be associated with a refund module, which may be triggered in situations where a refund may be due to a customer (e.g., during a transaction for purchasing goods or services). The external or third-party application (e.g., Gyft®, Bitcoin™ applications, etc.) may render a "refund" button on the client device (e.g., client device 202) to be used in such situations. Further, the refund module may report to the client device (e.g., client device 202) that a refund may have failed or succeeded.

Considering Gyft® as an exemplary payment method for several of the features described above, when a user 110 presses a button on a touchscreen of the client device 120 to initiate a method of payment using a Gyft® prepaid card, an associated Gyft® application may be permitted to control outputting data to certain portions of the display screen of the client device 120, such as to allow user interaction with the Gyft® application. The user interaction may include entering customer information, card information, or any other information requested by the Gyft® application. After the user enters the information requested by the GOO application, the Gyft® application may relinquish control of the display screen and return control of the display screen to the client device 120.

Considering Bitcoin™ as an exemplary payment method for several of the features described above, a merchant may install a bitcoin application on one or more client devices (e.g., client devices 202, 204, 206, and/or 208) and/or cloud services server(s) 210. For example, in an Android™ operating system environment, a bitcoin package (e.g., bitcoin.apk) may contain a manifest file that may contain an "intent" file, e.g., a list of services that the application provides. A POS services process (e.g., POS services process 216 and/or 222) may define a "pay intent" event that the bitcoin.apk may support. A merchant (e.g., user 110) may utilize a client device (e.g., client device 202) to initiate a transaction associated, for example, with a product or a service requested by a customer. The client device (e.g., client device 202) may render a bitcoin button that may be presented on the client device (e.g., client device 202), and may be selected as an additional tender method by the customer. In this example, the bitcoin application may provide means for handling bitcoin payments, when the bitcoin button is pressed by the merchant and/or the customer. The bitcoin application may communicate with a bitcoin server to authorize or decline payments to the dollar amount associated with the transaction. For example, if the customer chooses bitcoin as a payment method for purchasing a $10 product, the bitcoin application may communicate with the bitcoin server to determine whether there are enough funds to complete the transaction. If, for example, the customer's bitcoin balance was $7, the bitcoin application may return authorization for $7 and may present to the merchant and/or the customer that $3 is still owed. It is understood that the above is only an example, and other scenarios using Bitcoin™ or any other virtual currency may be used.

Alternative Register Module

As will be apparent from the following example, one potential application that can take advantage of certain features of the extensible POS platform is an alternative payment module that can run on client device 202 or cloud services server 210. The alternative register module can be built-in to certain client devices 202, but can also be provided as a third-party or external application. The alternative register module may be implemented to leverage a payment module.

A register module provided by a client device (e.g., client devices 202, 204, 206, and/or 208) may not provide certain functionalities for particular merchants (e.g., a pizza shop, a hardware store, etc.). As explained above, a client device (e.g., client devices 202, 204, 206, and/or 208) and/or cloud services servers 210 may include a register module that may be configured to provide a default or modified interface for an operator of the merchant/business to facilitate sales transactions. The register module may have bar code scanner functionality, check-out functionality, payment functionality, or any combination thereof. The alternative register module may be configured to communicate with a payment module associated with a client device (e.g., client devices 202, 204, 206, and/or 208) to accept available payment methods. Additional tender methods may be provided through third-party applications as explained above. The payment module or the additional tender methods may authorize or decline payment based upon the merchant and/or the customer during execution of a transaction (e.g., sales transaction of goods or services).

Extensible Receipts

In another embodiment, the POS services process (e.g., POS services process 216, and/or 222) may be configured to provide a receipt module. A receipt module may be configured to handle receipts for a given transaction (e.g., a sales transaction, etc.). Receipts may be order receipts, payment receipts, or any other types of receipts associated with a POS platform system, such as 100. As can be seen in the following example, the receipt module may generate events to serve as triggers for external and third-party applications that have registered to listen for a broadcast of that event. In this sense, the printing of a receipt can serve as a transaction modification that causes applications to take certain actions. In accordance with the specific example below, printing the receipt can cause other applications on client device 202, or any of the other client devices (e.g., 204, 206, and 208) or cloud services server 210 to add an image to the receipt.

When printing a receipt of a transaction that may have initiated on a client device (e.g., client device 202), a POS services process (e.g., POS services process 216) may broadcast to other client devices (e.g., client devices 204, 206, and/or 208) and/or to cloud services server(s) (e.g., cloud services server(s) 210) that a printing receipt event occurred. Applications running on these client devices (e.g., client devices 204, 206, and/or 208) may be interested in that event and may transmit one or more images to the POS services process (e.g., POS services process 216 and/or 222) within a predetermined time. In certain embodiments, the image may be inserted into the print job of the receipt in a manner not to impact the execution of printing the receipt.

Although the example above is for applications running on client devices, in accordance with the characteristics of the extensible POS platform described previously, any other applications (e.g., external application(s) 226, application(s) 220) may be configured to transmit one or more images to the POS services process associated with printing the receipt. For example, coupons, promotions, discounts, invitations to use a digital and/or virtual wallet, or any other relevant campaign may be inserted during the printing of a receipt. The invitation to use a digital and/or virtual wallet may allow a customer to pay for the transaction using the digital and/or virtual wallet. The image can be inserted using any kind of image format. It may also be inserted as a text string. The text string may be rendered by the print module and services process in accordance with a predetermined style which is separately from the content of the text string by the services process. It is understood that the above are only examples of images that may be inserted during the printing of a receipt and that other images of other campaigns may be inserted.

Wallet Extensibility

In another embodiment, the POS services process (e.g., POS services process 216 and/or 222) may be configured to communicate with a wallet application module residing on a third-party server. For example, in a sales transaction, payment may be made remotely using a wallet application. When a payment is made, cloud services server(s) (e.g., cloud service(s) server 210) and one or more client devices (e.g., client devices 202, 204, 206, and/or 208) may be updated with the payment status. For example, during a sales transaction, the POS services process may provide the wallet application module with an order ID and an amount that is due. The wallet application may return a payment notification using one or more payment merchants. Consequently, cloud services server(s) (e.g., cloud services server(s) 210) and one or more client devices (e.g., client devices 202, 204, 206, and/or 208) may be updated with the payment status. It is understood that the above is only an example of a wallet application transaction and that other wallet applications and transactions may be envisioned.

Computer System

Referring now to FIG. 3, therein is shown a diagrammatic representation of a machine in the example form of a computer system 300 within which a set of instructions, for causing the machine to perform any one or more of the methodologies or modules discussed herein, may be executed or instantiated, according to certain embodiments of the disclosure.

In the example of FIG. 3, the computer system 300 may include a processor 302, memory 306, non-volatile memory 310, and an interface device 312. Various common components (e.g., cache memory) are omitted for illustrative simplicity. The computer system 300 is intended to illustrate an example hardware device on which any of the components depicted in the examples of FIGS. 1 and 2 (and any other components described in this specification) may be implemented. The computer system 300 may be of any applicable known or convenient type. The components of the computer system 300 may be coupled together via a bus 330 or through some other known or convenient device.

This disclosure contemplates the computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable computer device, a server, or a combination of two or more of these. Where appropriate, computer system 300 may include one or more computer systems 300; be unitary or distributed; span multiple locations; span multiple machines; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

The processor 302 may be, for example, a conventional microprocessor such as an Intel™ Pentium™ microprocessor or Motorola™ Power PC™ microprocessor. One of skill in the relevant art may recognize that the terms "machine-readable (storage) medium" or "computer-readable (storage) medium" include any type of device that is accessible by the processor. The processor may include instructions 304.

The main memory 306 may be coupled to the processor 302 by, for example, a bus 330. The main memory 306 may include, by way of example but not limitation, random access memory (RAM), such as dynamic RAM (DRAM) and static RAM (SRAM). The main memory 306 may be local, remote, or distributed. The main memory 306 may include instructions 308.

The bus 330 may also couple the processor 302 to the non-volatile memory 310 and drive unit 322. The non-volatile memory 310 may often be a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data may often be written, by a direct memory access process, into memory during execution of software in the computer system 300. The non-volatile storage may be local, remote, or distributed. The non-volatile memory 310 is optional because systems may be created with all applicable data available in memory. A typical computer system may usually include at least a processor 302, a memory 306, and a device (e.g., a bus 330) coupling the memory 306 to the processor 302.

Software may typically be stored in the non-volatile memory 310 and/or the drive unit 322. The drive unit 322 may include a machine-readable (storage) medium 324. The machine-readable (storage) medium 324 may include instructions 326. Indeed, for large programs, it may not even be possible to store the entire program in the memory 306. Nevertheless, it should be understood that for software to run, if necessary, it is moved to a computer-readable location appropriate for processing, and for illustrative purposes, that location is referred to as the memory 306. Even when software is moved to the memory for execution, the processor 302 may typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor 302 is considered to be "configured to execute a program" when at least one value associated with the program is stored in a register readable by the processor 302.

The bus 330 may also couple the processor 302 to the network interface device 312 to communicate via one or more networks 314. The network interface device 312 may include one or more of a modem or network interface. It will be appreciated that a modem or network interface may be considered to be part of the computer system 300. The interface may include an analog modem, an integrated services digital network (ISDN) modem, a cable modem, a token ring interface, a satellite transmission interface (e.g., "direct PC"), or other interfaces for coupling a computer system to other computer systems. The interface may include one or more input and/or output (I/O) devices (e.g., video display 316, alpha-numeric input device 318, cursor control device 320, etc.). The I/O devices may include, by way of example but not limitation, a keyboard, a mouse or other pointing device, a gesture control and/or detection device, an eye movement control and/or detection device, disk drives, printers, a scanner, and other input and/or output devices, including a video display device 316. The video display device 316 may include, by way of example but not limitation, a cathode ray tube (CRT), a liquid crystal display (LCD), or some other applicable known or convenient display device. For simplicity, it is assumed that controllers of any devices not depicted in the example of FIG. 3 reside in the interface.

In operation, the computer system 300 may be controlled by operating system software that includes a file management system, such as a disk operating system. One example of operating system software with associated file management system software is the family of operating systems known as Windows® from Microsoft Corporation of Redmond, Wash., and its associated file management systems. Another example of operating system software with its associated file management system software is the Linux™ operating system. The file management system may typically be stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated (e.g., by signal generation device 328). It has proven convenient at times, principally for reasons of common usage, to refer to these signals as bits, values, elements, symbols, characters, terms, numbers, or the like.

Broadcast and Response Procedure

Figure 4:
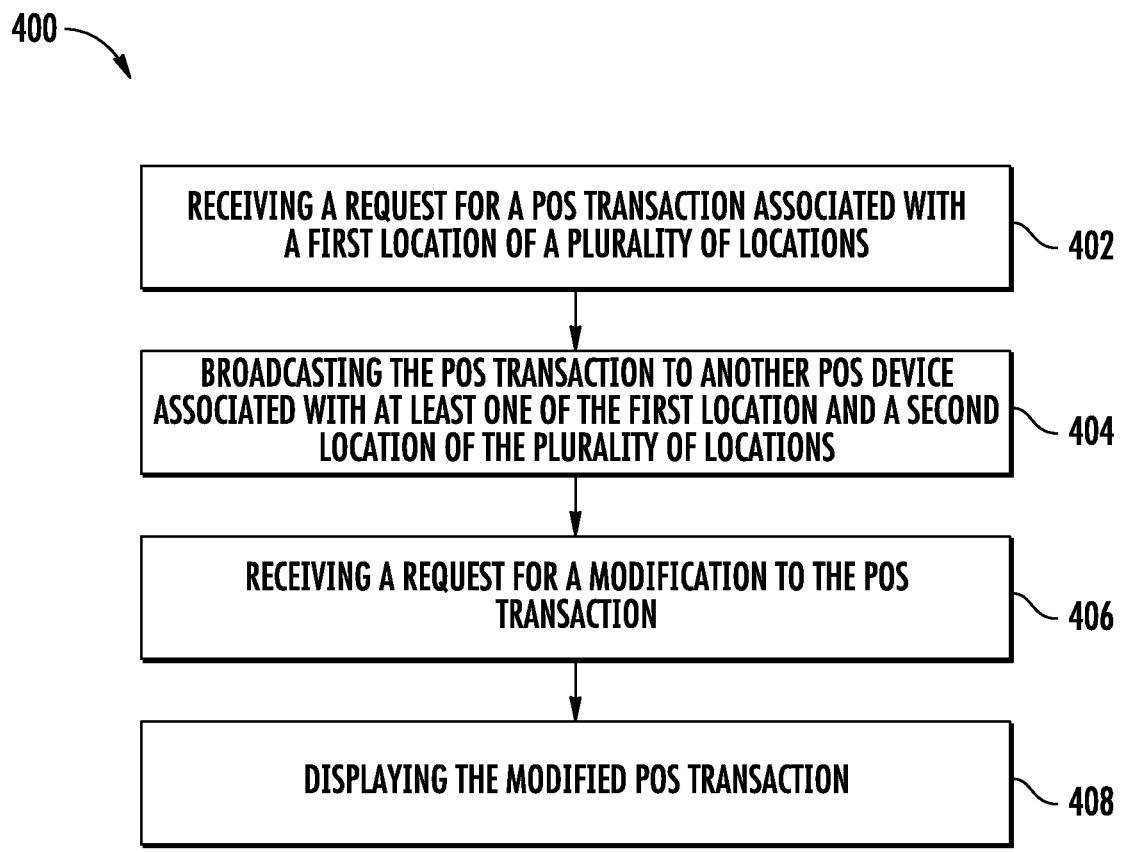
FIG. 4 illustrates a flow diagram of an example method for operating an extensible POS platform in accordance with one or more example embodiments.

Turning now to FIG. 4, a flow diagram of a method 400 for an extensible POS platform is illustrated according to one or more example embodiments. The method 400 may include block 402, in which a computer, such as a client device 120, a remote services server(s) 160, and/or a combination thereof may receive a request for a POS transaction associated with a first location of a plurality of locations. In block 404, the computer may broadcast, i.e. transmit, the POS transaction to another POS device associated with at least one of the first location and a second location of the plurality of locations. In block 406, the computer may receive a request for a modification to the POS transaction. In block 408, the computer may display the modified POS transaction.

The method 400 may be conducted in accordance with the examples provided above that illustrate the functionality of the extensible POS platform. For example, the transaction can be an entire transaction or a specific modification to a transaction. Furthermore, the broadcasting of modifications to the transaction can be to a set of applications that are registered to receive those modifications. The modifications to a transaction may be, for example, adding new items to the order, including a donation to a charity with the order, adding taxes, receiving payment information, printing a receipt, applying coupons, adding a special notice on the transaction, or any other changes associated with the transaction.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Display of Information on the User Interface

Figure 6:
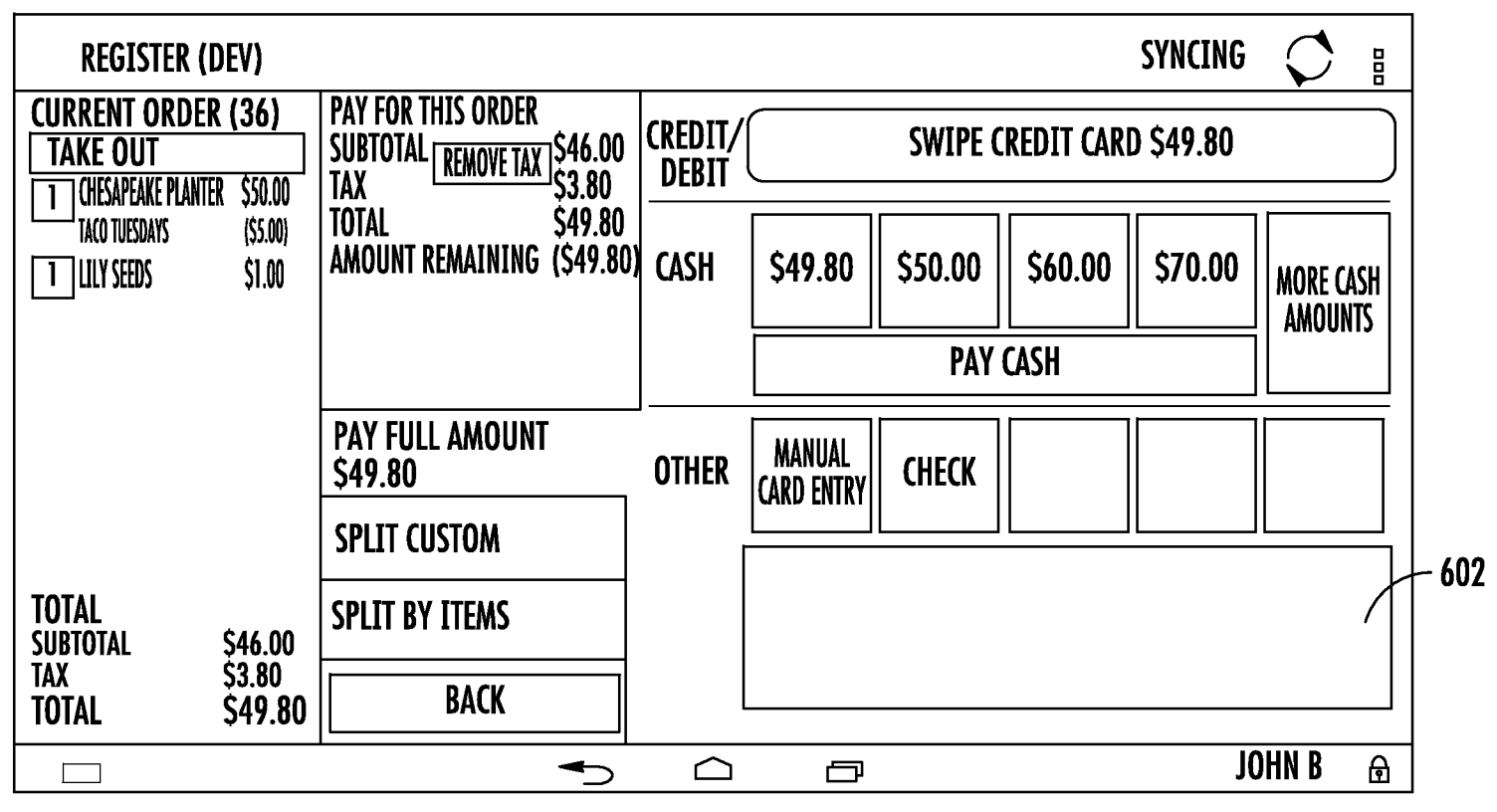

Referring to FIGS. 5 and 6, there are shown example user interfaces for an extensible POS platform in accordance with one or more example embodiments. FIG. 5 shows an example user interface that may be displayed on, for example, a customer-facing display screen of a client device during a purchase transaction, while FIG. 6 shows an example user interface that may be displayed on a merchant-facing display screen of a client device during a purchase transaction. As mentioned previously, third-party or external applications can share resources with a built-in application on the client device such that portions of the user interface can be generated by a register module, to provide information regarding a purchase transaction, while additional information from a third-party or external application is provided independently of the built-in application. The information can be provided concurrently along with the information from the register module.

In a purchase transaction between a customer user and a merchant user, the client device 120 may display one or more user interfaces to the merchant user and/or the customer user at various instances during the purchase transaction. A built-in register application may be used to instantiate the user interface. For example, when a merchant user enters a quantity and price of an item, a location on the display screen of the client device 120 may include one or more areas displaying information controlled by one or more third-party or external applications, such as 226. The portion of the screen associated with the third-party or external applications can also control certain features or functionality of the client device 120. The displayed information may be independent of the purchase transaction and may relate to the one or more third-party or external applications, such as 226, that may control a particular area of the display screen of the client device 120.

For example, area 502 of FIG. 5 is an area of a customer-facing user interface used by one or more third-party or external applications, such as 226, controlling certain features or functionality of the client device 120, to display information output by the one or more third-party or external applications 226. In certain instances, the one or more third-party or external applications 226 may generate for display in the area 502 of the customer-facing user interface, an announcement for the customer, such as an announcement about a particular charity, an invitation to donate an amount via a donation box, an announcement with event information, an invitation to apply a coupon to the transaction, an invitation to utilize a specific payment method for the transaction, an offer to add an additional item or service to the transaction, etc. Selection of the content can result in a modification to the transaction. The modification can be administrated by the third-party or external application.

In another example, area 602 of FIG. 6 is an area of a merchant-facing user interface where merchant-related information from one or more third-party or external applications, such as 226, may be displayed. The same information, content, and interactivity that is provided with respect to area 502 can be supplied in area 602. It is understood that the above are only examples of the various types of information. Other embodiments may vary in the location of information that can be displayed on a customer and/or merchant-facing user interface, and when a third-party or external application may display information such as before, during, or after a purchase transaction.

Multiple Applications on a POS Device

In some embodiments, multiple applications may be executed on the POS devices. The applications may be in communication with each other to share credentials and information. For example, one application that may execute on a POS device is a register application. A second application that may execute on the POS device may be an inventory application. Once a user signs into the register application, the register application and the inventory application may communicate with each other to pass authentication credentials so the user only has to sign into the system once. The register application may communicate with the inventory application to obtain information regarding the status of certain items in inventory. The different applications may be provided by the system or may be developed by third parties. In some embodiments, applications may have the ability to automatically discover each other and authenticate and interact with each other.

Payment Type Loyalty Program

In some embodiments, the POS platform may provide the ability for a merchant and/or a consumer to earn rewards for the use of specific payment types. For instance, if a merchant promotes the X Bank Card, and the customer uses that card as his or her payment type, the customer and the merchant may earn points (either fixed or in proportion to the amount spent at that merchant). The points may be redeemed via the POS platform during one or more purchase transactions that may be processed by the POS devices. The points may be associated with consumers via user profiles associated with consumers. The user profiles may be generated using information based at least in part on information received from the consumer. The user profiles may be stored in a remote database. The generated points or other loyalty-based incentives may be associated with the user profile and stored in association with the user profile. The POS devices may retrieve user profile information associated with the consumer, including information associated with the loyalty program, and may process transactions based at least in part on available loyalty program points. In some embodiments, the POS devices may retrieve a history of loyalty program points that have been earned, redeemed, expired, or the like.

CONCLUSION

Figure 7:
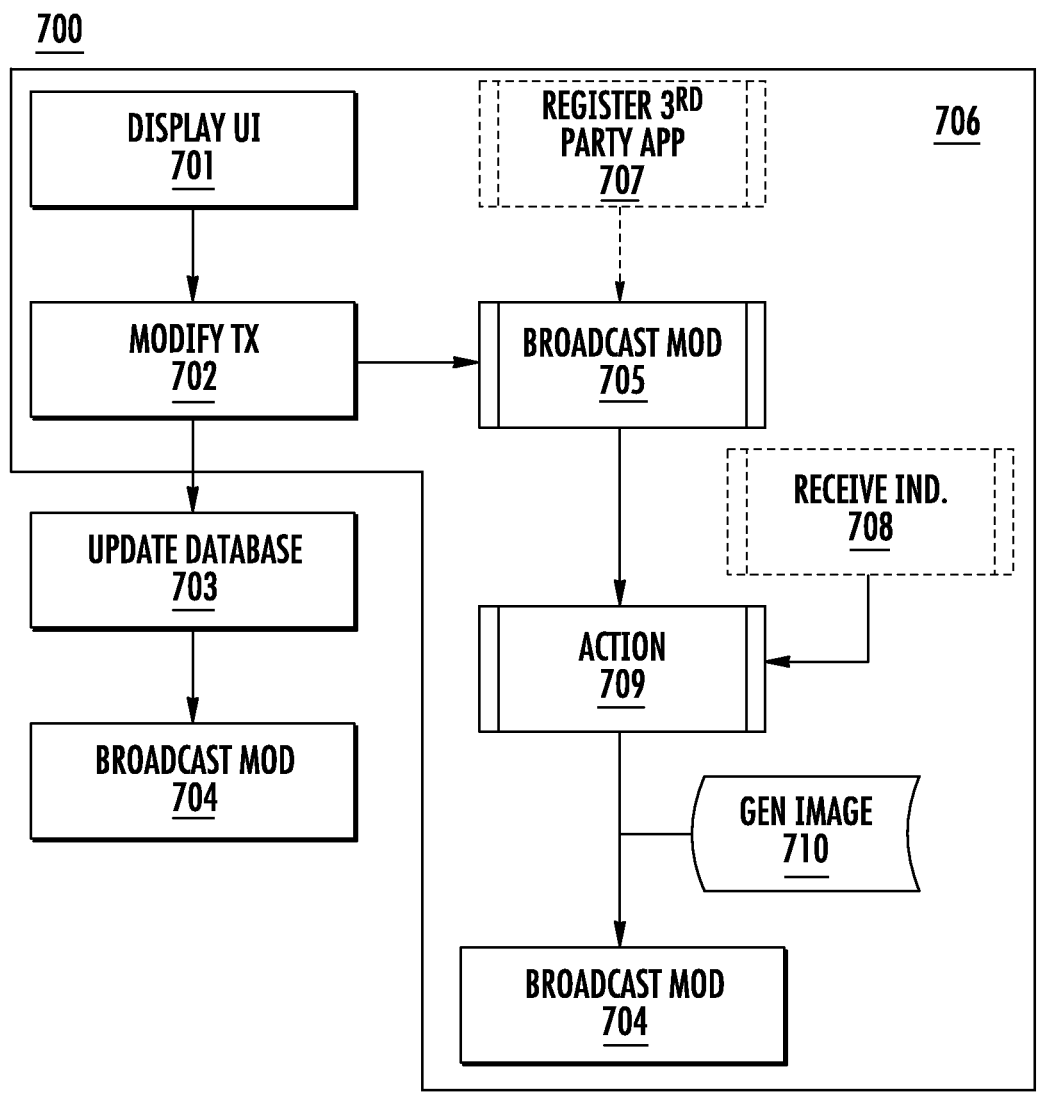
FIG. 7 illustrates a flow diagram of a set of example methods for an extensible POS platform in accordance with one or more example embodiments.

Specific approaches that are described above can be further illustrated by flow chart 700 in FIG. 7. Flow chat 700 includes a set of methods that are within the scope of the above disclosure and are provided to illustrate the potential of the extensible POS platform. In step 701, a user interface is displayed to a user in a purchase transaction on a display of a POS device using either the register module or the payment module described above. In step 702 a transaction change is received via the user interface of the POS device and is used to modify the transaction. The transaction modification can be any of the kinds of modifications described above including receiving a request to print a receipt for the transaction or adding an additional item for purchase to the transaction. However, in this example, the modification is adding an item for purchase to the transaction. In step 703, a database is updated with the transaction change. For example, an inventory database could be updated by decrementing an inventory count for a particular item when that item is added to a transaction. This step could also include updating additional databases with the modification. In step 704, the modification is broadcasted to a plurality of other POS devices.

As shown in flow chart 700, after the transaction modification is received in step 702, the modification can also be broadcast to a set of applications on the same POS device that received the modification. This is illustrated by step 705, which is conducted by the operating system 214. All of the steps in flow chart 700 that lie on area 706 can be conducted by a single POS device. This step can be preceded by step 707 in which a set of third-party applications are registered to receive the broadcast transmitted in step 705. Alternatively, or in combination with step 705, the third-party applications can receive an indication that a condition was met by the modification. This is illustrated by step 708. The indication can be generated by a process that uses the modification along with instructions to run a comparison against previously stored data.

The previously stored data associated with step 708 can be a certain dollar amount for a given transaction and the indication can indicate that the total value of the transaction exceeds that dollar amount. In step 709, an action can be taken that modifies the purchase transaction using the third-party application. As illustrated, the action can include generating a text string or an image in step 710 and adding that text string or image to a receipt or on a user interface of a display. The image can be generated prior to and independently of step 707 such that it is on hand whenever an action is taken to request the addition of a generic or category-specific image to the transaction flow. The image can be an optional coupon added to a receipt of the purchaser in return for spending a certain dollar amount during their transaction. However, in this example the image is of a coupon that will be applied to the current transaction which is presented on the display of the device. Note that the coupon could have been provided via either channel in response to the same stimulus, such that the actions taken and the impetus for those actions can be independently designed and implemented using the extensible POS platform disclosed herein. Furthermore, the action can itself serve as a modification to the transaction in a second iteration of step 702, which will propagate through the entire extensible POS platform. In this case, each POS device in the extensible POS platform would be able to keep track of how many coupons had been issued for a particular promotion without having to continuously access a central database to obtain that information.

In example embodiments of the disclosure, there may be a computer-implemented method. The method may include receiving, by a first point-of-sale (POS) device including one or more processors, a request for a POS transaction associated with a first location of a plurality of locations. The method may include transmitting, by the first POS device, the POS transaction to a second POS device associated with at least one of the first location and a second location of the plurality of locations. The method may include receiving, by the first POS device, a request for a modification to the POS transaction. The method may include displaying, by the first POS device, the modified POS transaction. The method may further include modifying by the first POS device, the POS transaction based upon, at least in part, the request for the modification to the POS transaction. The POS transaction may include at least one of a new item added to the order, a discount added, taxes added, coupons applied, a payment method selected, or transaction notes added. Transmitting the POS transaction may further include transmitting to a cloud services server. The plurality of locations may include locations where one or more POS devices are located. The order may be submitted at a client device associated with the first location of the plurality of locations. The payment method may include at least one of cash, a credit card, a virtual check, a virtual wallet, or virtual currency.

According to example embodiments of the disclosure, there may be a point-of-sale (POS) device. The point-of-sale (POS) device may include at least one memory storing computer-executable instructions and at least one processor, wherein the at least one processor may be configured to access the at least one memory and to execute computer-executable instructions. The at least one processor may be configured, in response to execution of the instructions, to receive a request for a transaction associated with a first location of a plurality of locations. The at least one processor may be configured, in response to execution of the instructions, to transmit the POS transaction to another POS device associated with at least one of the first location and a second location of the plurality of locations. The at least one processor may be configured, in response to execution of the instructions, to receive a request for a modification to the POS transaction. The at least one processor may be configured, in response to execution of the instructions, to display the modified POS transaction. The point-of-sale (POS) device may further include modifying the POS transaction based upon, at least in part, the request for the modification to the POS transaction. The POS transaction may include at least one of a new item added to the order, a discount added, taxes added, coupons applied, a payment method selected, or transaction notes added. Transmitting the POS transaction may further include transmitting to a cloud services server. The plurality of locations may include locations where one or more POS devices are located. The order may be submitted at a client device associated with the first location of the plurality of locations. The payment method may include at least one of cash, a credit card, a virtual check, a virtual wallet, or virtual currency.

In example embodiments of the disclosure, there may be a computer-readable medium storing computer-executable instructions which, when executed by a processor, cause the processor to perform operations. The operations may include receiving a request for a POS transaction associated with a first location of a plurality of locations. The operations may include transmitting the POS transaction to a POS device associated with at least one of the first location and a second location of the plurality of locations. The operations may include receiving a request for a modification to the POS transaction. The operations may include displaying the modified POS transaction. The operations may further include modifying the POS transaction based upon, at least in part, the request for the modification to the POS transaction. The POS transaction may further include at least one of a new item added to the order, a discount added, taxes added, coupons applied, a payment method selected, or transaction notes added. Transmitting the POS transaction may further include transmitting to a cloud services server. The plurality of locations may include locations where one or more POS devices are located. The order may be submitted at a client device associated with the first location of the plurality of locations. The payment method may include at least one of cash, a credit card, a virtual check, a virtual wallet, or virtual currency.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, although a majority of the application was directed specifically to pairing a POS printing device with a client device, the methods devices and systems disclosed above can be utilized to facilitate the association of any peripheral with a client device including networking devices (e.g., routers) to connect the client device to a network. As another example, any of the communications between the client device and the printing device described above may be conducted directly or be routed through a print server, one or more networks, or the like. These and other modifications and variations to the present invention may be practiced by those skilled in the art, without departing from the scope of the present invention, which is more particularly set forth in the appended claims.

What is claimed is:

1. A computer-implemented method for an extensible point-of-sale device, comprising:
 registering, with an operating system on the point-of-sale device, a third-party application to be notified of a transaction change on the point-of-sale device;
 displaying a user interface to a user during a purchase transaction on a display of the point-of-sale device using one of a register module and a payment module;
 receiving the transaction change via the user interface of the point-of-sale device;
 broadcasting the transaction change to a set of registered applications, on the point-of-sale device, that includes the third-party application; and
 taking an action that modifies the purchase transaction using the third-party application in response to the broadcasting;

wherein the set of registered applications are executed on the point-of-sale device; and wherein the set of registered applications share resources on the point-of-sale device.

2. The computer-implemented method for an extensible point-of-sale device of claim 1, wherein:

the action is inserting an image onto a receipt printed for the purchase transaction by the point-of-sale device.

3. The computer-implemented method for an extensible point-of-sale device of claim 2, wherein the action of inserting the image onto the receipt comprises:

transmitting the image to a services process on the point-of-sale device from the third-party application;

adding the image to the receipt using the services process; and printing the receipt for the purchase transaction using the services process.

4. The computer-implemented method for an extensible point-of-sale device of claim 1, wherein:

the action is inserting a text string onto a receipt printed for the purchase transaction by the point-of-sale device.

5. The computer-implemented method for an extensible point-of-sale device of claim 1, wherein:

the action is displaying information on the display of the point-of-sale device.

6. The computer-implemented method for an extensible point-of-sale device of claim 5, further comprising:

generating the information to display on the point-of-sale device using the third-party application; and displaying the information on an area of the display along with the user interface.

7. The computer-implemented method for an extensible point-of-sale device of claim 6, wherein:

the third-party application displays the information on the area of the display independently of the register module and the payment module; and one of the register module or the payment module concurrently displays transaction data along with the information on the display.

8. The computer-implemented method for an extensible point-of-sale device of claim 1, wherein:

the action is inserting a user interface element on a payment window display screen of the user interface.

9. The computer-implemented method for an extensible point-of-sale device of claim 8, wherein:

the third-party application displays the user interface element on the display; and the payment module concurrently displays a payment window on the display along with the user interface element.

10. The computer-implemented method for an extensible point-of-sale device of claim 9, wherein:

the user interface element initiates a method of payment provided by the third-party application.

11. An extensible point-of-sale device, comprising:

a POS processing service that registers a third-party application to be notified of a transaction change on the point-of-sale device;

a display that displays a user interface to a user during a purchase transaction; and a register module that receives the transaction change involving the purchase transaction via the user interface of the point-of-sale device;

wherein the third-party application is configured to take an action to modify the purchase transaction in response to a trigger; and wherein the POS processing service is configured to provide the trigger via a broadcast of the transaction change to a set of registered applications that includes the third-party application.

12. The extensible point-of-sale device of claim 11, further comprising:

a printer that prints a receipt for the purchase transaction with an added image using the POS processing service on the point-of-sale device;

wherein the action is transmitting the image to the POS processing service from the third-party application;

wherein the transaction change generates a printing receipt event to initiate a printing process; and wherein the trigger is the printing receipt event.

13. The extensible point-of-sale device of claim 11, further comprising:

a printer that prints a receipt for the purchase transaction with an added text string using the POS processing service on the point-of-sale device;

wherein the action is transmitting the text string to the POS processing service from the third-party application;

wherein the transaction change generates a printing receipt event to initiate a printing process; and wherein the trigger is the printing receipt event.

14. The extensible point-of-sale device of claim 11, wherein:

the action is generating information to display on the display; and the information is displayed on an area of the display along with the user interface.

15. The extensible point-of-sale device of claim 11, further comprising:

a network connection; and a local database that stores the transaction change in a queue;

wherein the point-of-sale device is configured to upload the transaction change from the queue via the network connection when the point-of-sale device is able to communicate with a server.

* * * * *